Aug. 20, 1968     D. W. MYERS     3,397,507

VACUUM PACKAGING APPARATUS

Filed Dec. 27, 1965     7 Sheets-Sheet 1

FIG.1

INVENTOR
DONALD W. MYERS
BY Hofgren, Wegner, Allen
Stellman & McCord
ATTORNEYS

Aug. 20, 1968          D. W. MYERS                3,397,507
              VACUUM PACKAGING APPARATUS
Filed Dec. 27, 1965                       7 Sheets-Sheet 3

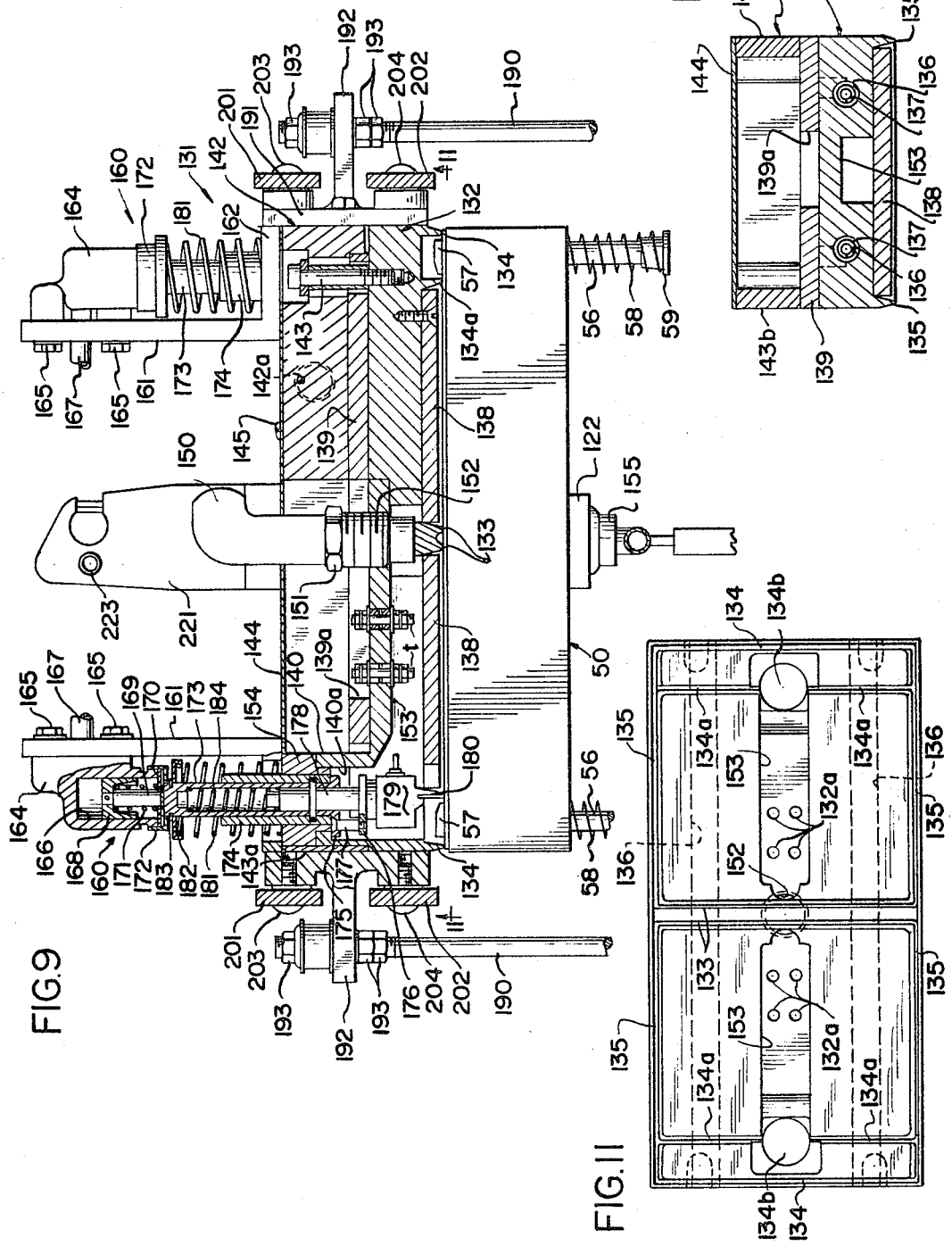

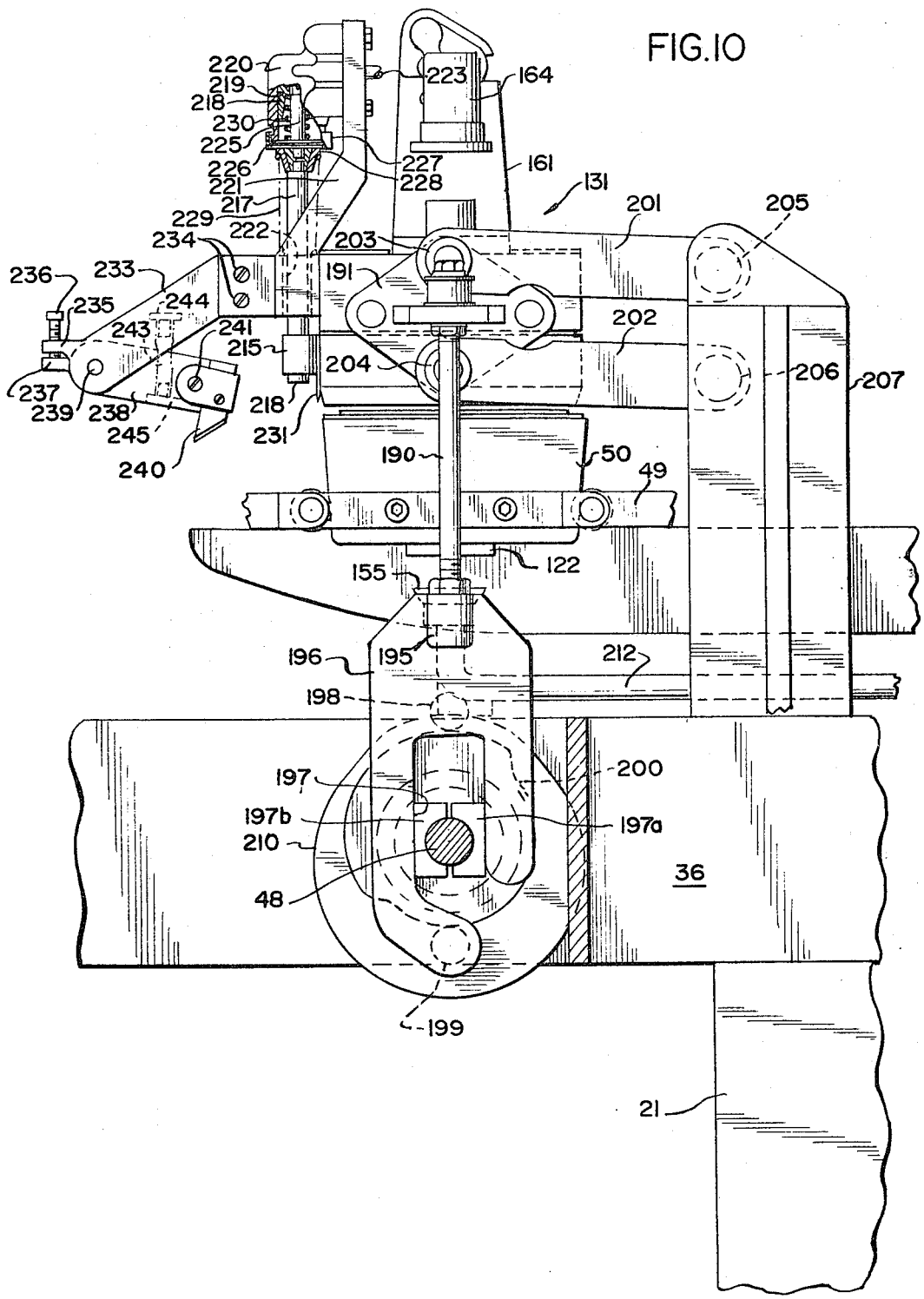

Aug. 20, 1968  D. W. MYERS  3,397,507
VACUUM PACKAGING APPARATUS
Filed Dec. 27, 1965  7 Sheets-Sheet 7

United States Patent Office 3,397,507
Patented Aug. 20, 1968

3,397,507
VACUUM PACKAGING APPARATUS
Donald W. Myers, Northbrook, Ill., assignor, by mesne assignments, to John Morrell & Co., Chicago, Ill., a corporation of Delaware
Filed Dec. 27, 1965, Ser. No. 516,559
7 Claims. (Cl. 53—112)

ABSTRACT OF THE DISCLOSURE

Vacuum packaging apparatus in which a lower layer of film is drawn downwardly into a product holder, and wherein an upper layer of film is bonded to the lower layer of film by a sealing head at a single sealing station. The sealing head includes first bonding means in the form of a rib having at least one discontinuous portion, which allow a vacuum to be drawn between the layers of film; and the sealing head further includes a final bonding means at the discontinuous portion of the rib for completing the bonding of the layers of film.

---

This invention relates in general to packaging apparatus, and more particularly to apparatus for packaging articles in a substantially evacuated receptacle.

In the past, it has been known to provide vacuum packaging apparatus with an intermittently driven endless conveyor having a plurality of compartment defining members thereon movable from a film drawing station wherein a first layer of film is clamped, heated and drawn into one of the compartment forming members to form a receptacle, to a loading station where the articles to be packaged are placed in the receptacle, to an initial sealing station where a second layer of film is partially sealed to the receptacle, to a further station where the air within the receptacle is withdrawn therefrom and complete sealing is effected, and to a package removal station where the packages are removed from the conveyor.

While such devices have functioned generally satisfactorily, several problems have been encountered in the use thereof. More particularly, in the past no effective means has been provided for positively positioning the opposite edges of the lower film layer under the film clamping means on the compartment forming member. It has been proposed to provide fixed members for tucking the edges of the film under the clamping means; however, these devices have proven to be unreliable and, in general, unsatisfactory.

Also, in the past, it has been conventional to fixedly mount a heater adjacent to the film drawing station for raising the temperature of the film to a point where the film may be easily drawn into the compartment forming member. This fixed heater has often burned or scorched the film whenever the conveyor of the machine is stopped for one reason or another.

Additionally, it has been conventional in the past to provide two sealing stations for sealing the upper layer of film to the receptacle in the compartment forming member. At the first sealing station, the upper layer of film is sealed to the lower layer of film around substantially the entire periphery thereof. The conveyor then moves the partially sealed package to a second sealing station, where the interior of the package is evacuated, and a further final seal is applied to the package. This arrangement is somewhat bulky, and the mechanism to effect the initial seal, evacuation, and final seal is rather complex.

In prior art machines, the package containing members are usually moved to an inverted position where the sole means for holding the packages in the containers is the film edge clamping means. This arrangement has proven to be undesirable, in that oftentimes the packages will fall out of the conveyor before they reach the package removal station.

Accordingly, the general purpose of the present invention is to provide a packaging machine which obviates each of the disadvantages noted above in connection with prior art machines, and which is simple in construction, efficient in operation, and relatively inexpensive to manufacture and maintain.

An object of the invention is to provide vacuum packaging apparatus with means for positively positioning opposite edges of a length of film under film clamping means on a compartment forming member.

Another object of the invention is to provide vacuum packaging apparatus as described in the previous paragraph with means for holding the clamping means in an inoperative position during the positive positioning of the film edges.

A further object of the invention is to provide vacuum packaging apparatus having a heater for raising the temperature of a layer of film to a level where it may be easily stretched with means for moving the heater to an inoperative position when the machine is shut off.

Still another object of the invention is to provide vacuum packaging apparatus as described above with improved means for drawing and retaining film into a compartment to form a receptacle for articles to be subsequently packaged.

A still further object of the invention is to provide a vacuum packaging machine with a single sealing head, so that an initial seal, package evacuation, and final seal can take place at a single sealing station.

Yet another object of the invention is to provide vacuum packaging apparatus as described above with novel means for positively holding the package within the package conveyor until the conveyor moves the package to a package removal station.

These and other objects of the invention will hereinafter become more fully apparent from the following description taken in connection with the annexed drawings, wherein:

FIG. 1 is a front perspective view of a preferred embodiment of the invention;

FIG. 4 is a view taken generally along line of 4—4 of FIG. 2;

FIG. 5 is an enlarged view taken generally along line 5—5 of FIG. 2;

FIG. 6 is a view taken generally along line 6—6 of FIG. 5;

FIG. 9 is a sectional view taken generally along line 9—9 of FIG. 8;

FIG. 10 is a view taken generally along line 10—10 of FIG. 7;

FIG. 11 is a view taken generally along line 11—11 of FIG. 9, with certain parts being broken away for clarity of illustration;

FIG. 12 is a view taken generally along line 12—12 of FIG. 8;

Figure 2:
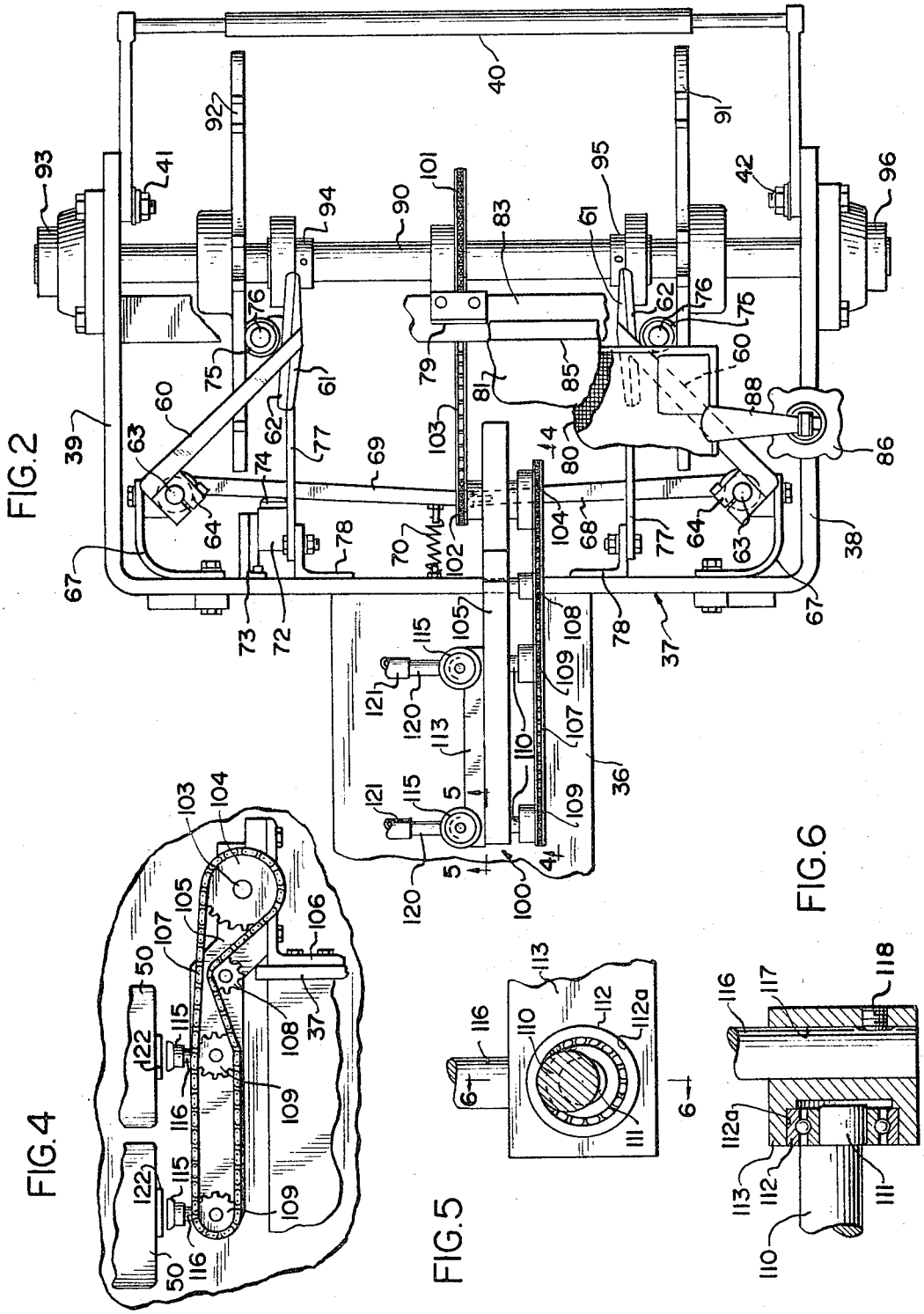
FIG. 2 is an enlarged, fragmentary plan view of the rear end of the machine, with certain parts being broken away for clarity of illustration.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

The vacuum packaging machine of the present invention is shown in its entirety at 20 in FIG. 1. The machine 20 has a supporting frame, including a plurality of spaced, inverted U-shaped standards 21, 22 and 23; longitudinally extending brace members 24, 25, 26 and 27; transversely extending brace members 28, 29 and 30; and longitudinally extending siderails 31 and 32. A center beam 36 is secured to standards 21–23, and extends substantially from end to end of the machine. A first generally U-shaped in plan view frame member 37 is secured to center beam 36 at the rear end of the machine, and includes spaced legs 38 and 39. A second generally U-shaped frame member 37a is secured to center beam 36 at the front of the machine, and includes spaced legs 38a and 39a.

A first supply of suitable plastic film (not shown) is provided at the rearward end of the machine on a roll 33 secured to the frame member 23 by a bracket 34. A film guide member 40 is secured to legs 38 and 39 as by screws 41 and 42, and film from the roll 33 is drawn over the guide member 40 to a film gripping station at the rear end of the machine.

Means are provided for conveying compartment forming members 50 to and from the film gripping station, and herein this means comprises an endless conveyor driven intermittently by spaced sprockets 45 on a shaft 46 rotatably supported at the front of the machine in legs 38a and 39a. Means, such as a Geneva drive mechanism, is provided for imparting intermittent motion to the endless conveyor, and to this end a suitable Geneva drive member (not shown) may be provided on a shaft 48 at the front of the machine for driving a suitable follower member (not shown) mounted in a housing 47 and secured to shaft 48. A motor M is mounted on the frame of the machine, and is connected to shaft 48 through a suitable drive system, not shown. The endless conveyor is defined by a plurality of interconnected links 49 (FIGS. 14 and 15) which carry rollers thereon that engage the sprockets 45.

Figure 3:
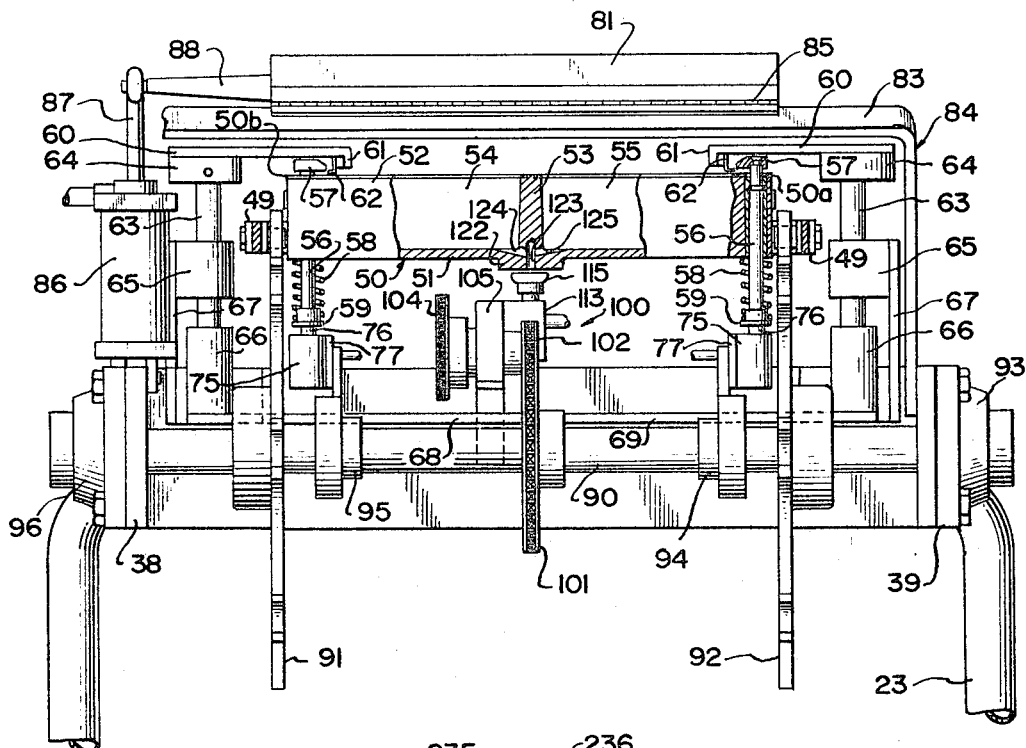
FIG. 3 is a rear elevational view of the machine of FIG. 1, with certain parts being removed for clarity of illustration, and other parts being shown in section.
Figure 8:
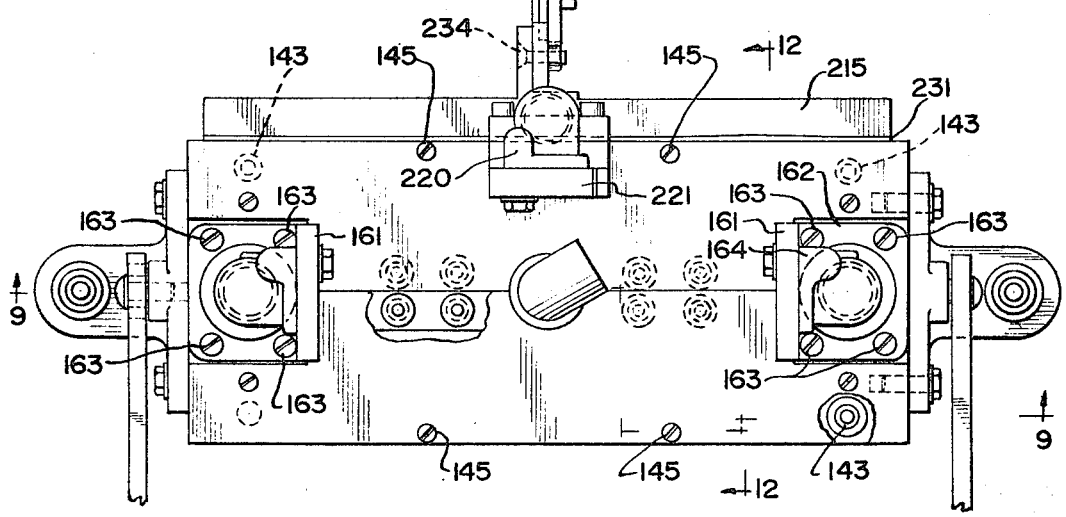
FIG. 8 is a top plan view of the sealing head.
Figure 7:
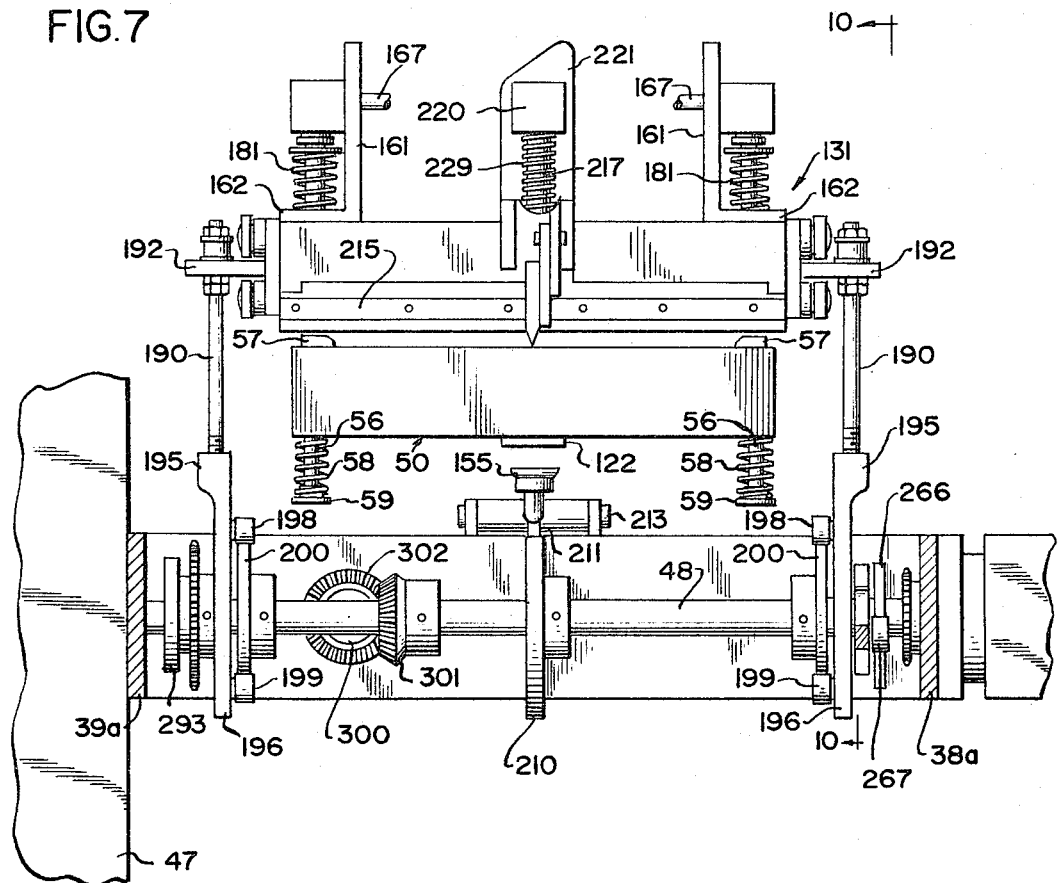
FIG. 7 is a view taken generally along line 7—7 of FIG. 1 looking at the front of the sealing head, and having certain parts broken away for clarity of illustration.

Compartment forming members 50 are each carried by a pair of links 49, and the construction of members 50 is best seen in FIG. 3. As shown therein, each of the members 50 is a generally rectangular, open cup-like structure having a bottom 51, upstanding peripheral side walls 52, and a transverse central wall 53 dividing the member into two adjacent compartments 54 and 55. As will hereinafter become more fully apparent, the compartments 54 and 55 are adapted to receive the product to be packaged. It will be obvious to those skilled in the art that the member 50 may have more or less than two compartments therein, if desired.

Means are provided on member 50 for clamping the opposite edges of the film being fed off of roll 33, and this means includes a clamp 56 at each side of the member 50, with each clamp 56 having an enlarged clamping head 57 at the upper end thereof. Helical springs 58 surround the clamp members 56, and bear against enlarged flange members 59 at the lower end of members 56 to bias the members 56 downwardly and to urge the heads 57 into clamping engagement with the sides of the film. Gaskets 50a and 50b are secured to the upper portion of member 50 for a purpose to hereafter appear.

Means are provided for positively positioning the opposite edges of the film under the clamping heads 57, and this means comprises a pair of horizontally disposed, angularly inwardly extending tucker arms 60 (FIG. 2). The innermost ends of tucker arms 60 are elongated in a direction extending generally longitudinally of the machine, and angle members 62 are screwed to elongated portions 61 with the lower flanges of members 62 being disposed in a horizontal plane. Tucker arms 60 are each secured to a vertically extending shaft 63 by a suitable clamp member 64, and shafts 63 are mounted for rotation in support members 65 and 66 carried by brackets 67 secured to the frame 37. Tucker arm actuating means is connected to shafts 63, and includes a pair of actuating arms 68 and 69 connected to one another at their innermost ends for movement together, and each connected to a shaft 63 at its outer end. A spring 70 is connected between frame 37 and arm 69 to normally hold the angle members 62 on the tucker arms in an inoperative position. A hydraulic cylinder 72 is mounted on frame 37 by a bracket 73, and the piston 74 of the cylinder 72 bears against arm 69 to move the arms 68 and 69 outwardly from the frame 37 when the cylinder is actuated. It will be appreciated that when the piston 74 moves outwardly, the angle members 62 also move outwardly, and the lower flanges thereof project under the clamping heads 57 to tuck the film thereunder.

As can be best seen in FIG. 3, means are provided for positively lifting the clamping heads 57 away from the upper surface of the member 50 during the tucking operation, and this means includes a pair of hydraulic cylinders 75 that are each carried by a support member 77 secured to frame 37 by a mounting bracket 78. Cylinders 75 each include a vertically disposed piston 76 that is adapted to engage the lower portion of the clamp members 56 upon actuation of the cylinders for moving the members 56 upwardly against the bias of springs 58. After the film has been tucked under clamping heads 57, the heads are urged into clamping engagement with the film edges by springs 68.

The film is preferably of the type which is readily stretchable after heat has been applied thereto; and, accordingly, the present invention provides means for heating the film, and further means for drawing the heated film downwardly into the compartments 54 and 55 in the member 50. The means for heating the film includes a heating element 80 (FIG. 2) mounted within a suitable housing 81. Housing 81 is pivotally mounted by a hinge 85 on the bight portion 83 of a suitable generally U-shaped support member 84. Housing 81 is mounted for movement between a generally horizontally disposed operative or heating position shown in full lines in FIG. 1, and an inclined or nonoperative position shown in broken lines at 81a in FIG. 1. A stop member 79 is fixed on the portions 83 of support 84 to locate the housing 81 in the inclined position. A pneumatic cylinder 86 is provide for moving the housing 81, and a rod 87 is connected to the piston of the cylinder 86, and to an arm 88 extending laterally outwardly from the heater housing 81. The lower end of the cylinder 86 is secured by suitable means to the frame member 37. Stop members 89 (FIG. 1) are provided at opposite sides of the frame for positively locating the heater housing 81 in the operative heating position.

Thus, after the film has been fed off of the roll 33, around the guide member 40, and tucked under the clamping heads 57, the film is heated by the heating element 80 sufficiently to render the same readily stretchable. The member 50 formerly in the film clamping station is then moved to the film drawing station 43 positioned immediately forwardly of the film clamping station. The links 49 of the endless conveyor are trained over and drive sprockets 91 and 92 on a driven shaft 90 that is rotatably mounted between the sides 38 and 39 of frame member 37 by bearings 93 and 96. Bearings 94 and 95 carried by supports 77 provide additional support for shaft 90. It will be readily appreciated that shaft 90 is rotated intermittently in response to the intermittent motion transmited by the Geneva drive mechanism carried within housing 47.

Power take-off means are provided for utilizing the motion of shaft 90 for actuating a vacuum drawing assembly 100 in a manner to be hereafter described. The power take-off means includes a sprocket 101 mounted on shaft 90 for rotation therewith, and driving a further sprocket 102 through an endless chain 103. Sprocket 102 is mounted on a common shaft 103 (FIG. 4) with a further sprocket 104. Shaft 103 is rotatably mounted in a suitable support member 105 that is secured to the frame 37 by a bracket 106. An endless chain 107 is trained over sprocket 104, over an idler sprocket 108 rotatably mounted within support 105, and over a pair of longitudinally spaced further sprockets 109. Sprockets 109 are each mounted on shafts 110 having eccentric portions 111 rotatably mounted by bearings 112 in openings 112a within a suction cup actuating block 113. Block 113 is positioned in face abutting relationship with support 105 so that as sprockets 109 are rotated by chain 107, the member 113 is moved cyclically upwardly an amount determined by the throw of eccentric shaft portions 111. A pair of suction cups 115 are carried on shafts 116 that are held within openings 117 in member 113 by set screws 118. Suction cups 115 are each connected to a vacuum source by flexible tubes 121 that are secured to connectors 120 which communicate with the interior of the suction cups 115.

Each member 50 is provided with a central boss 122 on the bottom thereof. A generally vertical bore 123 (FIG. 3) is provided in each boss 122, and passages 124 and 125 extend outwardly from each bore 123 into compartments 54 and 55 respectively. Thus, when the suction cups 115 are moved into engagement with the bosses 122 by the eccentric means described above, a suction is applied in the compartments 54 and 55, and the previously heated film will be drawn into the compartments. The rearwardmost suction cup 115 serves to initially draw the film into the compartments 54 and 55 in the member 50 positioned thereabove, while the forwardmost suction cup 115 serves to retain the previously drawn film in the compartments 54 and 55 in the member 50 positioned thereabove. Suitable article receiving inserts, now shown, may be provided in the compartments 54 and 55, for shaping the film into a desired package configuration; however, it will be understood that if such inserts are used, passage means will be provided in the same so that the suction drawn through openings 124 and 125 will be effective to draw the film into the inserts.

The size relationship between the sprockets of the power take-off system is such that the chain 107 is moved at approximately twice the speed of the conveyor members 49 and 50. The eccentric shaft portions 111 are coordinated with the Geneva drive system to shaft 90, so that the suction cups 115 will be in positive vacuum drawing relationship with bores 123 when the shaft 90 is stationary. During the intermittent rotations of the shaft 90, the member 113 retains its horizontal attitude, and first moves downwardly and outwardly, and then upwardly and inwardly to position the suction cups 115 in engagement with the bosses 122 on the members 50 moving into the film drawing station.

After the lower layer of film has been drawn into the compartments 54 and 55 to effectively define article receiving receptacles, the members 50 are intermittently moved from rear to front of the machine by the Geneva drive mechanism past an article loading station 125, and thence to a sealing station 126 (FIG. 1). The articles to be packaged may be manually or automatically placed in the compartments 54 and 55 on top of the film therein at the loading station 125. A second supply of film (not shown) is provided at adjacent sealing station 126 on a roll 127, and is drawn therefrom over a suitable film guide 128 by power driven rollers, also not shown, that are rotated by driven means within housing 129 operated by a motor 130. As it will be well understood by those skilled in the art, the film from roll 127 provides the upper portion of the packages for the articles in the compartments 54 and 55, and the film from roll 127 is usually provided with indicia designating the contents of the packages, etc. Suitable means, not shown, may be provided for insuring that the indicia on the film from roll 127 will be properly aligned with the articles in compartments 54 and 55.

A sealing head 131 is provided at the sealing station 126 for sealing the upper layer of film from the roll 127 to the film within compartments 54 and 55 to complete the packages. Sealing head 131 includes an initial sealing member 132, which is a generally rectangular plate-like member. Member 132 includes first and second peripherally continuous sealing means for sealing the upper layer of film in substantially air-tight relationship around the articles within compartments 54 and 55 respectively, and these means include transverse outer sealing ribs 134, transverse inner sealing ribs 133, and longitudinal sealing ribs 135 connecting ribs 133 and 134. Transversely discontinuous sealing ribs 134a are provided inwardly of sealing ribs 134, and define open areas 134b, for a purpose to hereafter appear. The sealing ribs 133, 134 and 135 are engageable with the gaskets 50a and 50b on the member 50 in the sealing position to provide a substantially air-tight seal around the periphery of the packages in compartments 54 and 55.

A pair of longitudinally extending holes 136 are provided in member 132, and suitable heating elements 137 are positioned therein for heating the aforedescribed sealing ribs. Member 132 is preferably formed of a suitable material, such as an aluminum alloy, having a relatively high coefficient of thermal conductivity, so that when the heating elements 137 are energized, and the heat sealing ribs 133, 134a and 135 are brought into engagement with the upper layer of film, the two film layers will be heat sealed to one another. Suitable insulating members 138 and 139 are provided on the lower and upper surfaces, respectively, of member 132. Upstanding bosses 140 are provided at opposite ends of member 132, and vertical bores 140a are provided in bosses 140 for reception of final sealing means to be hereafter described for sealing the unsealed areas 134b.

Heat sealing head 131 includes a second generally rectangular member 142 seated on top of member 132, and having end walls 143a received over bosses 140 and flush with the ends of member 132, and side walls 143b flush with the sides of member 132. Member 142 is secured to member 132 in a sandwich-like relation by screws 143 which pass through countersunk holes in the enlarged corners of member 142. A suitable cover 144 is secured to the member 142, as by plurality of screws 145 around the periphery thereof.

First vacuum drawing means are provided for drawing a vacuum through the outwardly facing opening between the upper and lower layers of film inwardly of ribs 134 adjacent unsealed areas 134b of the partially sealed package. This means includes an elbow 150 connected to a suitable vacuum drawing source, and extending downwardly through an opening in cover 144, and an opening 139a in insulator 139. A fitting 151 at the lower end of elbow 150 is threaded into an internally threaded hole 152 in member 132. Member 132 includes a pair of laterally outwardly extending passages 153 which communicate with opening 152 and with the bores 140a in bosses 140. Bushings 154 seal the upper ends of bores 140a, so that when a vacuum is applied to elbow 150, the air remaining within the partially sealed packages will be removed through the unsealed areas 134b.

A second source of vacuum is applied externally of the partially sealed packages within the compartments 54 and 55 to retain the lower film layer away from the packaged articles, so that the application of the first vacuum drawing means will effectively withdraw air from the packages. To this end, a suction cup 155, connected to a suitable vacuum source, is movable into engagement with the boss 122 on the package forming member 50 in the sealing position to apply a vacuum to the member through the bore 123 and passages 124 and 125.

After the air has been substantially withdrawn from the partially sealed packages within the compartments 54 and 55, final seal means 160 (FIG. 9) operable in bores 140a, are actuated to seal the areas 134b. The final seal means 160 are carried by an L-shaped bracket 161 having a foot portion 162 secured to the sealing head 131 by screws 163. A cylinder housing 164 is secured adjacent the upper portion of each member 161 by screws 165. A generally vertically disposed bore 166 is provided within each housing 164, and a pressurized source of hydraulic fluid communicates with each bore 166 through a line 167.

A piston 168 is mounted for vertical reciprocal movement within each cylinder 166, and a stem 169 is secured to piston 168 as by a pin or the like. An enlarged shoulder is provided at the lower portion of stem 169, and an annular disk 170 is held against the shoulder by a spring 171. A cup-like retaining ring 172 is provided at lower end of housing 164 around the disk 170.

A tubular member 173 having a closed upper end is mounted for reciprocal movement within a tubular bushing 174 mounted in bushing 154. The upper end of member 173 is adapted to be engaged by the lower end of stem 169 when pressure under fluid is admitted into cylinder 166. Member 173 includes an outwardly extending flange 175 at the lower end thereof, which is secured to an outwardly extending flange 176 on a plunger member 178 by a screw 177. Plunger 178 carries a sealing head 179 at the lower end thereof, which has a downwardly extending sealing member 180 thereon adapted to seal the open area at 134b in the partially sealed package after the air has been evacuated therefrom. A suitable heating element, not shown, is provided in each head 179 for heat sealing the unsealed film portions at 134b to one another. Electrical leads, not shown, extend inwardly of the head 131 through an opening 142a in member 142, and are connected to leads, also not shown, from the heating elements at terminals t in openings 132a in member 132.

A return spring 181 bears against the upper surface of bushing 154, and against a cup-like ring 182 held against axial movement on member 173 by a snap-ring 183 to return the member 173 to an upper unactuated position. The spring 171 serves to properly locate the piston 168 in an unactuated position within the cylinder 166. Member 173 is generally tubular, and a spring 184 is provided in the interior thereof, and bears against the upper surface of the plunger 178 to provide means for cushioning the engagement of the heat seal portion 180 of head 179 with the member 50.

Means are provided for moving the head 131 into and out of a sealing position, and includes actuating rods 190 at opposite sides of head 131. Mounting brackets 191 are secured to opposite sides of the sealing head 131 by screws or the like, and each includes a central web portion 192 through which the respective actuating rods 190 extend. The upper ends of actuating rods are threaded, and are held against the webs 192 by nuts 193. The lower ends of actuating rods 190 are threaded into internally threaded bosses 195 (FIG. 10) on actuating levers 196. Levers 196 each include an elongated clearance opening 197 receiving shaft 48 therethrough. Cam follower rollers 198 and 199 are provided on levers 196 above and below the slots 197, respectively. A suitable cam 200 is fixed on shaft 48 in vertical alignment with each of the pairs of cam follower rollers 198 and 199. Cams 200 each include an enlarged actuating portion, so that upon rotation of the shaft 48, the levers 196 will be reciprocated vertically by engagement of the enlarged cam portion with the cam follower rollers 198 and 199. Bushings 197a and 197b are provided in openings 197 to guide plates 196. This vertical reciprocation of the levers 196 will move the sealing head 131 into and out of the sealing position through the connection provided between actuating rods 190.

The sealing head 131 is mounted for movement in a generally vertical plane by parallel linkage means including links 201 and 202 pivoted at their forward ends 203 and 204, respectively (to bracket 191), and pivoted at their rearward ends 205 and 206, respectively, to a support member 207. A cam 210 on shaft 48 engages a follower 211 on a support 212 to move the suction cup 155 about pivot 213 into and out of engagement with bosses 122.

After the packages within the compartments 54 and 55 have been evacuated and completely sealed, a knife carrying member 215 adjacent the forward portion of the sealing head 131 is actuated to sever the sealed film between adjacent member 50. The means for actuating the knife carrying member 215 includes a vertically reciprocal plunger 217 having its lower end 218 secured to member 215, as by a press fit into an opening in member 215. Plunger 217 is actuated by a piston 218 mounted for reciprocal movement in a bore 219 of a cylinder housing 220. Housing 220 is secured to a mounting bracket 221 that is fixed to the front of sealing head member 142. Actuating rod 217 passes through a clearance opening 222 in bracket 221, and a bushing may be provided in opening 222 to guide the rod 217. As will hereinafter be explained, a pressurized source of hydraulic fluid communicates with bore 219 through an inlet pipe 223, and the pressurized fluid serves to drive the piston 218 downwardly within the cylinder 219. A stem 225 is secured to piston 218 as by a pin or the like, and stem 225 includes an enlarged head at the lower end thereof upon which an annular ring 226 is seated. A cup-like retaining ring 227 surrounds the lower end of housing 220, and the ring 226. A flanged member 228 is secured to the upper end of actuating rod 217, and a return spring 229 is provided between member 228 and bracket 221 to urge actuating rod 217 upwardly after knife-carrying member 215 has been actuated. A further spring 230 acts between piston 218 and ring 226 to return piston 218 to a proper position within the bore 219. A suitable knife blade 231 is secured to the member 215, so that upon actuation of the rod 217, the knife 231 is reciprocated downwardly to sever the film transversely between adjacent pairs of packages.

Knife means are also provided for severing the film longitudinally between adjacent packages in compartments 54 and 55 of each member 50, and includes a first bracket member 233 secured to bracket member 221 by screws 234. Member 233 includes an internally threaded forwardly extending ear 235 having a screw 236 threaded therethrough. The lower portion of screw 236 bears upon a forwardly extending lug 237 on a knife-carrying member 238 pivotally secured to member 233 at 239. A suitable knife blade 240 is secured to member 238 at 241, and it will be appreciated that the position of blade 240 can be adjusted by threading screw 236 through ear 235. A spring 243 acts between a flange 244 on member 233 and a flange 245 on member 238 to urge the blade 240 to a proper cutting position.

After the packages within compartments 54 and 55 have been evacuated, completely sealed, and severed both longitudinally and transversely, the packages are moved to a package removal station 250 (FIG. 1) at the lower front of the machine, where they are removed from the member 50. In order to prevent premature displacement of the completed packages from a member 50 prior to movement of the member to the removal station 250, positive means are provided for holding the packages within the member 50. This mechanism will be best understood from a consideration of FIGS. 14 and 15, where the four forwardmost positions of the member 50 have been shown as a, b, c and d, respectively. The holding means includes an open generally triangularly shaped support arm 251 defined by diverging sides 252 and 253, and a transverse connecting portion 254. A hub 255 of member 251 mounts the same on shaft 46 for oscillatory movement relative thereto. A pair of shafts 256 and 257 extend transversely of member 251 at the outer end of sides 252 and 253, respectively. Two laterally spaced spring-like plates 258 are fixed to shaft 256, with each plate 258 being positioned in alignment with one of the compartments in the members 50 for holding the packages in the compartments. In a like manner, a pair of laterally spaced spring-like plates 259 are secured to shaft 257; however, the plates 259 differ from plates 258 in that they are provided with elongated openings 260 therein. Openings 260 provide access for package removal means to be hereinafter described.

Figure 14:
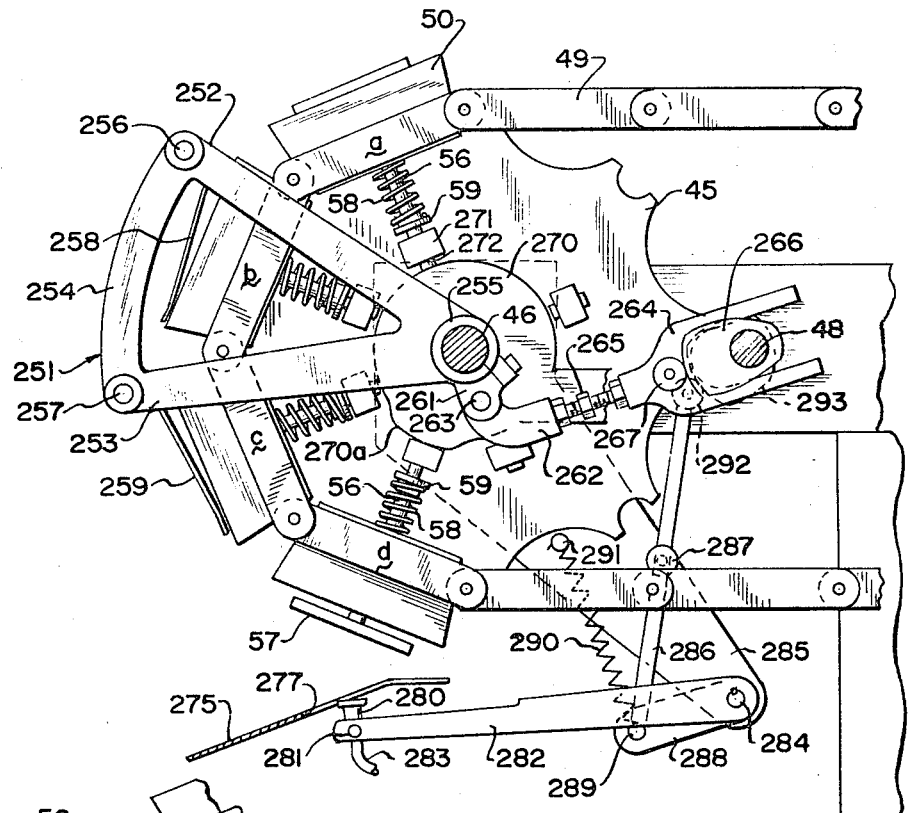
FIG. 14 is a view taken generally along line 14—14 of FIG. 7.
Figure 15:
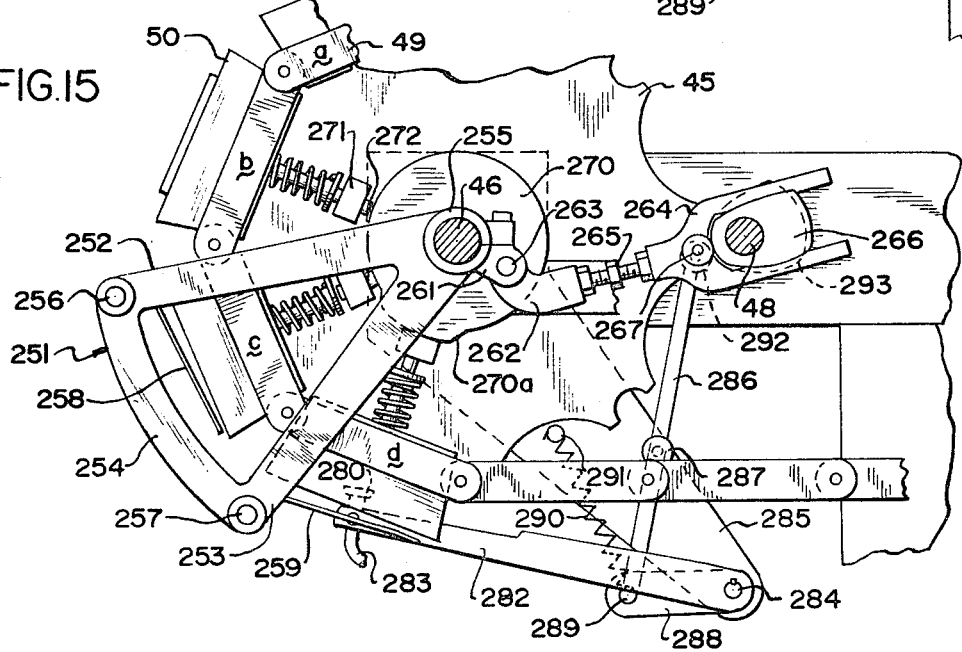
FIG. 15 is a view similar to FIG. 14, and showing certain parts in a different position.

Member 251 further includes an arm portion 261, which extends generally downwardly and rearwardly from hub 255 as viewed in FIGS. 14 and 15. A connecting rod 262 is pivotally connected to arm 261 at 263, and the other end of connecting rod 262 is connected to a cam follower carrier 264 through an adjustable link 265. A cam 266 is mounted for rotation with shaft 48, and cam 266 engages a cam follower roller 267 on member 264 for actuation of member 251. Thus, when the rise portion of cam 266 is in engagement with the cam follower roller 267, the member 251 will be in the position shown in FIG. 14, and the plates 258 will be in the position "b" while the plates 259 will be in the position "c." Although the film clamping heads 57 are gripping the outer edges of the packages in the compartments 54 and 55, it will be appreciated that in the position "c" of FIG. 14 the member 50 is partially inverted, and the plates 259 serve to retain the packages within the member 50 even if the packages should come free from clamping heads 57. Means to be hereafter described are provided for releasing the film clamping heads 57 as a member 50 moves from position "c" to position "d," and the rise portion of cam 266 is coordinated with the period of the Geneva drive mechanism, so that as a member 50 moves from position "c" to position "d," the member 251 is moved into the position shown in FIG. 15. In this position, the plates 258 serve to insure that the packages at station "c" will be retained within the member 50, even though the film clamping heads 57 have not yet been released. While the film clamping heads 57 are released as a member 50 moves into position "d"; nevertheless, the plates 259 serve to retain the packages within the member 50 until positive package pull-out means to be hereafter described are actuated.

The means for releasing the film clamping heads 57 includes fixed cams 270 mounted on shaft 46 adjacent sprockets 45, and held against rotation along with shaft 46 by suitable brackets connected to the frame of the machine. Cams 270 each include a rise portion 270a radial alignment with position "d." A plurality of brackets 271 (eight in the illustrated embodiment) are secured to each sprocket 45, at equally circumferentially spaced positions therearound. A lift pin 272 is slidably mounted in a bore of each of the brackets 271, and is engageable with cam 270 and with enlarged portion 59 at the lower end of the clamp members 56. Thus, as the members 50 are moved into the position "d," the inner ends of the lift pins 271 ride over the rise portions 270a of cams 270 to force members 56 outwardly against the bias of springs 58 and release the clamping heads 57 from the edges of the packages. At this time, the packages are loosely retained within the compartments 54 and 55 of the member 50 in the "d" position, and are positively held therein by the plates 259.

A release plate 275 is secured to the front of the machine frame at the package removal station 250 by arms 276 (FIG. 1). Plate 275 is inclined downwardly, so as to guide packages removed from the compartments 54 and 55 to a further conveyor means, not shown. Plate 275 is provided with a pair of laterally spaced apertures 277 for passage therethrough of the package pull-out means to be hereafter described.

The package pull-out assembly includes a pair of suction cups 280 provided at laterally spaced positions on a transverse shaft 281. Shaft 281 is carried by a pair of generally fore and aft extending arms 282 fixed to a further shaft 284 that is pivotally secured to a mounting plate 285 carried by the frame. Suitable suction lines 283 connect the cups 280 with a source of vacuum. A generally vertically disposed shaft 286 passes through the bore of a guide sleeve 287 pivotally mounted on plate 285, and the lower end of shaft 286 is pivotally secured to the forward end of a connecting arm 288 at 289. The rear end of connecting arm 288 is fixedly secured to shaft 284. A spring 290 is connected between pivot 289 and a pin 291 on mounting plate 285 to urge the shaft 286 vertically upwardly. A cam follower roller 292 is provided at the upper end of shafts 286, and is held in engagement with a suitable cam 293 on shaft 48 by spring 290. Cam 293 is positioned on shaft 48 relative to cam 266 such that when the member 251 is in the position shown in FIG. 15, the cam follower 292 on shaft 286 is held against the low portion of cam 293 by spring 290, so that the suction cups 280 are urged upwardly through the openings 277 in plate 275 and the openings 260 in plates 259 into engagement with the packages in the compartments 54 and 55. The application of suction through the lines 283 applies a positive removal force to the packages, and they are positively dislodged from the member 50. As shaft 48 continues to rotate, the member 251 is moved upwardly to the position of FIG. 14, while the suction cups 280 are moved downwardly to the position of FIG. 14, and the packages thus removed from the member 50 in the "d" position move onto the plate 275 from which they slide to the further conveyor, not shown.

Figure 13:
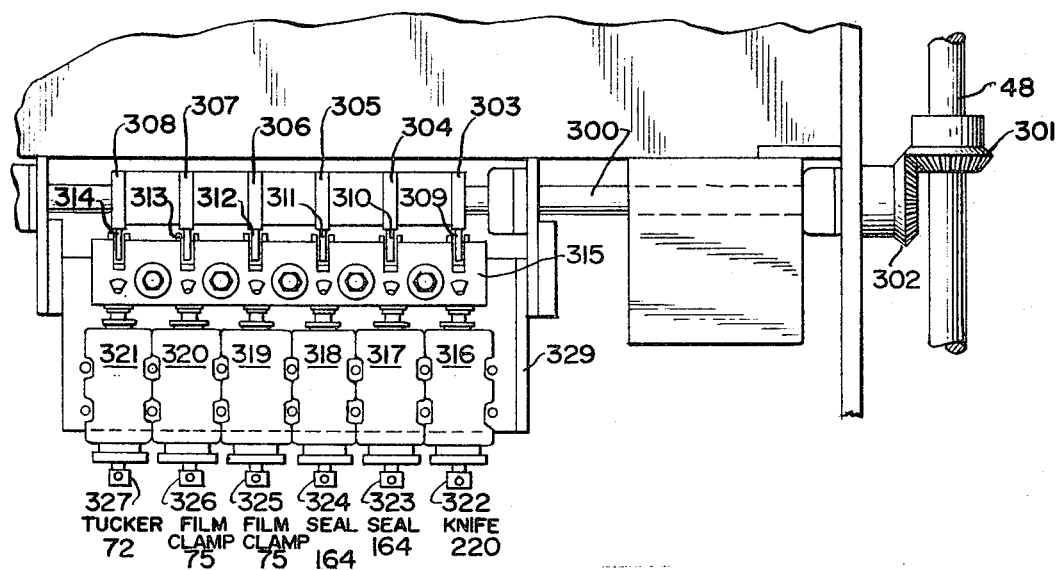
FIG. 13 is a fragmentary detail view showing the left-hand lower side of the front of the machine, as viewed in FIG. 1.

The means for operating the hydraulic cylinders 72, 75, 75, 164, 164 and 220 will be best understood from a consideration of FIG. 13. As shown therein, a cam shaft 300 is rotated by shaft 48 through bevel gears 301 and 302. A plurality of cams 303, 304, 305, 306, 307 and 308 are mounted on cam shaft 300, and are engageable with respective cam followers 309, 310, 311, 312, 313 and 314, which in turn reciprocate respective pistons in master control cylinders 316, 317, 318, 319, 320 and 321. Cylinders 316–321 are secured to a mounting plate 329 fixed on the machine frame, and cam followers 309–314 reciprocate in a block 315 also secured to mounting plate 329. The respective outlet lines 322, 323, 324, 325, 326 and 327 of master cylinders 316, 317, 318, 319, 320 and 321 are connected in a closed circuit with slave cylinders 220, 164, 164, 75, 75 and 72 respectively. The master cylinders are each preferably provided with a piston return spring which cooperates with the piston return spring of the respective slave cylinder to position the master cylinder pistons in an unactuated position when the rise portion of the master cylinder actuating cams moves out of engagement with the respective cam followers.

Suitable means are also provided for operating the pneumatic devices 86, 115, 150, 155 and 280; and such means preferably includes a motor driven pump within a housing P (FIG. 1) at the base of the frame. The pump is connected to center beam 36 for drawing a vacuum in the interior thereof, and cylinder 86 and suction cups 115, 115, 280 and 280 are connected to the chamber within beam 36 through air valves controlled by a suitable electric circuit, not shown. The sealing head vacuum applying members 150 and 155 are preferably connected to a vacuum line provided by the customer, and these devices are also actuated by air valves controlled by a suitable electric circuit.

I claim:
1. In a vacuum packaging machine having a conveyor, means on said conveyor for supporting a plurality of article receiving receptacles, means for supporting a supply of film adjacent said conveyor, said film being adapted to be sealed to at least one of said receptacles at a sealing station, and means for driving said conveyor to move said receptacles to and from said sealing station; sealing means at said sealing station comprising: a single sealing head; means on said sealing head for bonding said film to the receptacle around a major portion of the periphery of the receptacle at said sealing station to leave a relatively small unbonded portion; vacuum applying means on said head for drawing a vacuum through said unbonded portion; and further means on said head for bonding said unbonded portion after the interior of said receptacle has been substantially evacuated.

2. A vacuum packaging machine as defined in claim 1 wherein the means on said head for bonding said film around the major portion of the receptacle includes a sealing plate having a discontinuous sealing rib thereon engageable with said film for bonding the same to said receptacle.

3. A vacuum packaging machine as defined in claim 2 wherein said plate includes a first opening at the discontinuous portion of said rib, with said further bonding means being positioned in said opening.

4. A vacuum packaging machine as defined in claim 3 in which said sealing rib has a further discontinuous portion with a second opening being provided in said plate at the further discontinuous portion, said vacuum applying means being connected to said first and second openings through a passage in said plate connecting said first and second openings; and wherein another bonding means is positioned in said second opening for bonding the unbonded portion of said receptacle at the further discontinuous portion.

5. A vacuum packaging machine as defined in claim 4 wherein first means are provided for moving said sealing head between an inactive position spaced from the receptacle at the sealing station and an active position wherein the sealing rib presses said film against said receptacle, and second means are provided for moving said further bonding means between an inactive position within said opening and an active position pressing said film against said receptacle at said discontinuous rib portion.

6. A vacuum packaging machine as defined in claim 5 wherein means are provided for heating said rib and said further bonding means for heat sealing said film to said receptacle.

7. A vacuum packaging machine as defined in claim 5 wherein hydraulic cylinder means are provided for moving said further bonding means between inactive and active positions.

References Cited

UNITED STATES PATENTS

| | | | |
|---|---|---|---|
| 3,283,469 | 11/1966 | McBrady et al. | 53—112 X |
| 3,303,628 | 2/1967 | Lovas et al. | 53—112 X |
| 3,343,332 | 9/1967 | Mahaffy et al. | 53—112 X |

TRAVIS S. McGEHEE, *Primary Examiner.*